(12) United States Patent
Stenger et al.

(10) Patent No.: US 11,989,943 B2
(45) Date of Patent: May 21, 2024

(54) IMAGE FRAME EXTRACTION APPARATUS AND IMAGE FRAME EXTRACTION METHOD

(71) Applicant: Rakuten Group, Inc., Tokyo (JP)

(72) Inventors: Bjorn Stenger, Tokyo (JP); Geethu Jacob, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 311 days.

(21) Appl. No.: 17/548,684

(22) Filed: Dec. 13, 2021

(65) Prior Publication Data

US 2022/0207874 A1 Jun. 30, 2022

(30) Foreign Application Priority Data

Dec. 28, 2020 (JP) ................................. 2020-219223

(51) Int. Cl.
*G06V 20/40* (2022.01)
*G06V 10/22* (2022.01)
*G06V 10/46* (2022.01)
*G06V 10/764* (2022.01)

(52) U.S. Cl.
CPC .............. *G06V 20/46* (2022.01); *G06V 10/22* (2022.01); *G06V 10/469* (2022.01); *G06V 10/764* (2022.01); *G06V 20/41* (2022.01)

(58) Field of Classification Search
CPC ...... G06V 20/46; G06V 10/469; G06V 20/41; G06V 10/22; G06V 10/764
See application file for complete search history.

(56) References Cited

U.S. PATENT DOCUMENTS

2021/0223046 A1* 7/2021 Li .................. G05D 1/0274
2022/0036052 A1* 2/2022 Prince ................ G06V 20/46

FOREIGN PATENT DOCUMENTS

| CN | 107315795 A | 11/2017 |
|---|---|---|
| JP | 2000-350156 A | 12/2000 |
| JP | 2002335473 A | 11/2002 |
| JP | 2011-170892 A | 9/2011 |
| JP | 2011-215963 A | 10/2011 |
| WO | 2014/030442 A1 | 2/2014 |

OTHER PUBLICATIONS

Rochan, Mrigank, Linwei Ye, and Yang Wang. "Video summarization using fully convolutional sequence networks." Proceedings of the European conference on computer vision (ECCV). 2018. (Year: 2018).*

(Continued)

*Primary Examiner* — Utpal D Shah
(74) *Attorney, Agent, or Firm* — Sughrue Mion, PLLC

(57) ABSTRACT

Disclosed herein is an image frame extraction apparatus that acquires a video image; extracts features of each of a plurality of image frames of the acquired video image; analyzes the extracted features of each of the plurality of image frames, and extracts candidates of a representative frame from the plurality of image frames; and, for each of the extracted candidates of the representative frame, calculates a displacement in a shape space of a pose of an object in the image frame with respect to a reference pose, and select the representative frame from the candidates of the representative frame based on the calculated displacement in the shape space.

13 Claims, 14 Drawing Sheets

(56) References Cited

OTHER PUBLICATIONS

Einfalt, Moritz, et al. "Frame-level event detection in athletics videos with pose-based convolutional sequence networks." Proceedings Proceedings of the 2nd International Workshop on Multimedia Content Analysis in Sports. 2019. (Year: 2019).*

Zhang, Yuexi, et al. "Key frame proposal network for efficient pose estimation in videos." European Conference on Computer Vision . Cham: Springer International Publishing, 2020. (Year: 2020).*

Cai, Jiaxin, Xin Tang, and Ranxu Zhong. "Silhouettes based human action recognition by procrustes analysis and fisher vector encoding." 2018 International Conference on Image and Video Processing, and Artificial Intelligence. vol. 10836. SPIE, 2018. (Year : 2018).*

* cited by examiner

IMAGE FRAME EXTRACTION APPARATUS AND IMAGE FRAME EXTRACTION METHOD

CROSS-REFERENCE TO RELATED APPLICATIONS

This application is related to and claims priority under 35 U.S.C. 119 (a) to Japanese patent application No. 2020-219223, filed on Dec. 28, 2020, of which disclosure including the specification, drawings and abstract is incorporated herein by reference in its entirety.

TECHNICAL FIELD

The present invention relates to an image frame extraction apparatus and an image frame extraction method, and in particular to a technique for extracting a representative image frame from video image data.

BACKGROUND ART

A technique for extracting representative image frames from video image data has been known.

For example, by extracting a representative image frame in advance from various video image data that is accessible through a network and setting the extracted representative image frame as a thumbnail, it is possible to facilitate retrieval and browsing of desired video image data. Further, by selecting a representative image frame extracted in advance from the video image data as a still image to be posted on articles, posters, or the like related to the video image data, it is possible to effectively appeal the contents of the video image data to users.

By using only representative image frames for archiving instead of the entire video image data, which has a huge amount of data, the memory resources required for archiving can be significantly reduced.

For example, Patent Literature 1 (Laid-open Publication of Japanese Patent Application No. 2000-350156 A) discloses a method of storing video image information in which a frame having the maximum feature amount as a representative image in a video image divided into chunks.

More particularly, according to the method of storing video image information disclosed in the Patent Literature 1, the video image indexing program obtains a feature amount of a frame image in a video image and displays the obtained feature amount together with the video image on a display. When a scene change of the input video image is detected, the video image indexing program sets the frame having the maximum feature amount for each scene as the representative image of the scene, creates an icon image from the representative image, and displays the created icon images in a list on the display.

The feature amount used in the Patent Literature 1 includes a sum of the luminance of an image, the total number of specific colors in an image, a sum of edges of an image, and acoustic data.

LISTING OF REFERENCES

Patent Literature

PATENT LITERATURE 1: Laid-open Publication of Japanese Patent Application No. 2000-350156 A

SUMMARY OF THE INVENTION

Problems to be Solved by the Invention

However, as in the technique of the Patent Literature 1, when a representative image is selected depending solely on the size of the feature amount of each image frame, it is not necessarily possible to extract an image frame that appropriately represents the video image data.

More particularly, for example, assume that a video image of an action is in question. There are many types of video images of actions, for example, kicking, high jumping, bowling, and so on. For this reason, each image frame to be extracted from the video image of each action is required to summarize the action concerned in a straightforward manner. At the same time, each image frame to be extracted from the video image of each action is required to sufficiently distinguish the action concerned from other actions.

However, in the technique of the Patent Literature 1, especially in the case of an action video image captured with a fixed angle of view, it is difficult to appropriately select an image frame that summarizes the action in a straightforward manner because of little change in the feature amount of an object and backgrounds in an image between image frames. Also, it is difficult to ensure that the image frame selected solely by the size of the feature amount of each image frame is sufficiently distinguished from other actions.

The present invention has been made in order to solve the above mentioned problems and an object thereof is to provide an image frame extraction apparatus and an image frame extraction method capable of extracting a representative image frame from video image data more appropriately and with higher accuracy.

Solution to Problems

In order to solve the above mentioned problems, according to one aspect of the present invention, there is provided an image frame extraction apparatus, comprising: at least one memory configured to store program code; and electric circuitry including at least one of a field programmable gate array (FPGA), an application specific integrated circuit (ASIC), and at least one processor, the at least one processor being configured to read and operate according to the program code, the electronic circuitry configured to: acquire a video image; extract features of each of a plurality of image frames of the acquired video image; analyze the extracted features of each of the plurality of image frames, and extract candidates of a representative frame from the plurality of image frames; and for each of the extracted candidates of the representative frame, calculate a displacement in a shape space of a pose of an object in the image frame with respect to a reference pose, and select the representative frame from the candidates of the representative frame based on the calculated displacement in the shape space.

Selecting the representative frame may select, as the representative frame, an image frame including a pose having the largest distance in the shape space with respect to the reference pose.

Selecting the representative frame may map coordinates of the pose of the object in the plurality of image frames to the shape space, respectively, and sets a mean pose obtained by averaging the mapped coordinates of the pose to the reference pose.

Selecting the representative frame may superimpose, by applying at least one of centering, scaling, and rotational transformation, the coordinates of the pose of the object in the plurality of image frames so as to minimize a squared error between the coordinates, and calculates Procrustes distance of the coordinates of the pose with respect to coordinates of the reference pose, and selects, as the representative frame, an image frame including a pose having the smallest calculated Procrustes distance.

Selecting the representative frame may select the representative frame from the candidates of the representative frame using a learning model that is trained such that a loss is to be smaller for a first loss function that calculates the loss of the pose of the object with respect to the coordinates of the reference pose.

The image frame extraction apparatus further comprises: a classifier that classifies the plurality of image frames into one of a plurality of classes and assigns the classified class to each of the plurality of image frames; and selecting the representative frame may select the representative frame based on the class assigned by the classifier.

Selecting the representative frame may select the representative frame from the candidates of the representative frame using a learning model that is trained such that an output of a second loss function is to be smaller, the second loss function employing, as a numerator, a loss in features of image frames to which a same class are assigned, and employing, as a denominator, a loss in features of image frames to which different classes are assigned.

Extracting candidates of the representative frame may extract the candidates of the representative frame using a learning model that uses the classes assigned to the plurality of image frames, respectively, by the classifier as a sole training label.

Extracting candidates of the representative frame may calculate a score of probability of being extracted as a candidate of the representative frame based on features analyzed by a convolution operation for each of the plurality of image frames, and extract, as the candidate of the representative frame, an image frame having a higher score of the calculated probability.

Extracting candidates of the representative frame may reconstruct the features by weighting the features of each of the extracted plurality of image frames using the calculated scores of probability as a weight, and extracts the candidates of the representative frame based on the reconstructed features.

Extracting candidates of the representative frame may recursively calculate the score of probability using information of the calculated displacement in the shape space as a weight.

According to another aspect of the present invention, there is provided an image frame extraction method executed by an image frame extraction apparatus, comprising: acquiring a video image; extracting features of each of a plurality of image frames of the acquired video image; analyzing the extracted features of each of the plurality of image frames, and extracting candidates of a representative frame from the plurality of image frames; and for each of the extracted candidates of the representative frame, calculating a displacement in a shape space of a pose of an object in the image frame with respect to a reference poste, and selecting the representative frame from the candidates of the representative frame based on the calculated displacement in the shape space.

According to yet another aspect of the present invention, there is provided an image frame extraction computer program product for causing a computer to execute an image frame extraction, the computer program product causing the computer to execute processing comprising: a video image acquisition process for acquiring a video image; a feature extraction process for extracting features of each of a plurality of image frames of the video image acquired by the video image acquisition process; a representative frame candidate extraction process for analyzing the features of each of the plurality of image frames extracted by the feature extraction process, and extracting candidates of a representative frame from the plurality of image frames; and a representative frame selection process, for each of the candidates of the representative frame extracted by the representative frame candidate extraction process, for calculating a displacement in a shape space of a pose of an object in the image frame with respect to a reference pose, and selecting the representative frame from the candidates of the representative frame based on the calculated displacement in the shape space.

Advantageious Effect of the Invention

According to the present invention, it makes it possible to extract a representative image frame from video image data more appropriately and with higher accuracy.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Figure 1:
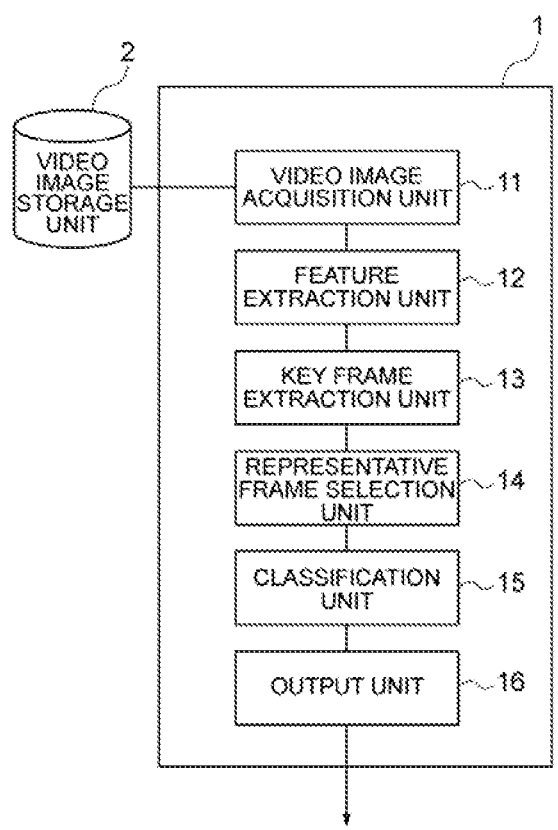
FIG. 1 is a block diagram showing an exemplary functional configuration of an image frame extraction apparatus according to an embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

An image frame extraction apparatus according to the present embodiment extracts a group of image frames from a video image based on features of each image frame constituting the video image, and classifies the group of image frames into one of a plurality of classes.

The image frame extraction apparatus also automatically extracts a representative frame from the extracted group of image frames based on a displacement of a pose of an object in each image frame with respect to a reference pose and the class of the classified group of image frames.

Hereinafter, a certain example will be described in which the image frame extraction apparatus acquires an action video image where an object (e.g., a person) in a video image dynamically performs a specific motion of action, and extracts, as a representative image frame, an image frame including an iconic pose that summarizes each action in a straightforward manner from the acquired action video image. Hereinafter, one or more representative image frames that summarize each video image in a straightforward manner and are sufficiently distinguishable from other video images are referred to as a representative frame.

However, the present embodiment is not limited thereto. The image frame extraction apparatus may, for example, extract a representative frame from any kind of video image that includes an object with some motion. Further, the video image to be processed by the image frame extraction apparatus may be a video image captured with the angle of view substantially fixed, or a video image captured while dynamically changing the angle of view using the pan, tilt, and zoom functions of an imaging device, or a video image with scene switching.

It should be noted that, according to the present embodiment, the video image may be input to the image frame extraction apparatus in any compression encoding format including MPEG (Moving Picture Experts Group)-2, MPEG-4, AVI (Audio Video Interleave), WMV (Windows Media Video) and the like.

<Functional Configuration of Image Frame Extraction Apparatus>

FIG. 1 is a block diagram showing an exemplary functional configuration of an image frame extraction apparatus 1 according to the present embodiment.

The image frame extraction apparatus 1 shown in FIG. 1 includes a video image acquisition unit 11, a feature extraction unit 12, a key frame extraction unit 13, a representative frame selection 14, a classification unit 15, and an output unit 16.

The video image acquisition unit 11 acquires video image data from a video image storage unit 2 and supplies the acquired video image data to the feature extraction unit 12. The video image acquisition unit 11 may divide the video image data input from the video image storage unit 2 into a plurality of groups of image frames (i.e., image frame groups) at an arbitrary separation, for example, before and after a scene switching. The video image storage unit 2 is constituted with a non-volatile storage device and may be provided locally in the image frame extraction apparatus 1 or remotely connected thereto.

The video image acquisition unit 11 may receive the video image data from an opposing device via a communication interface instead of the video image storage unit 2.

The video image acquisition unit 11 may also receive input of various parameters necessary for performing the image frame extraction processing by the image frame extraction apparatus 1.

The feature extraction unit 12 extracts features of each image frame constituting the video image from the video image data supplied from the video image acquisition unit 11, and supplies the extracted features of each image frame to the key frame extraction unit 13.

More particularly, the feature extraction unit 12 may extract features of each image frame of the video image data using a network for image recognition, such as a neural network. The features of each image frame extracted by the feature extraction unit 12 may include RGB, luminance, edges, a pose (or posture) of an object to be analyzed in the video image, and acoustic features of each image frame. The feature extraction unit 12 may also extract features of a motion of an object (e.g., a person) in the video image in a time series over a predetermined period of time.

The key frame extraction unit 13 analyzes the features of each image frame supplied from the feature extraction unit 12 and extracts a plurality of key frames, which serve as candidates for the representative frame of each video image.

More particularly, according to the present embodiment, the key frame extraction unit 13 inputs the features of each image frame to the unsupervised learning model, and calculates a probability score for each image frame from the features of each image frame, which have been convoluted using the convolutional operation by the unsupervised learning model. The key frame extraction unit 13 extracts a plurality of key frames based on the calculated probability scores and the features of each image frame convoluted using the convolution operation, and supplies the extracted plurality of key frames to the representative frame selection unit 14.

The representative frame selection unit 14 selects a representative frame representing the video image from a plurality of key frames supplied from the key frame extraction unit 13.

More particularly, according to the present embodiment, the representative frame selection unit 14 takes as input the coordinate information of the pose that the object to be analyzed in each image frame has, calculates a displacement of the coordinate information of the input pose with respect to a reference pose, and evaluates the calculated displacement using a predetermined evaluation function so as to select one or a plurality of representative frames.

As a non-limiting example, the representative frame selected by the representative frame selection section 14 may be an image frame that includes a pose in which the limb joint position of the object in the image frame is farthest from the limb joint position in the reference pose of the object (i.e., an extreme pose, which will be described in detail below).

The classification unit 15 classifies each image frame of a video image into a plurality of classes.

More particularly, according to the present embodiment, the classification unit 15 classifies the key frames into a plurality of classes based on the features of the key frames supplied from the key frame extracting unit 13 and the representative frame selection unit 14, and supplies the labels of the classes, which are the classification results of the key frames, to the key frame extraction unit 13 and the representative frame selection unit 14.

For example, in the case of an action video image, the classification unit 15 classifies each image frame of the action video image into one of a plurality of classes, such as kicking, high jumping, bowling, and the like, labels the image frame concerned with the classified class. Hereinafter, a class into which the action video image is classified is referred to as an action class.

The output unit 16 outputs the image of the representative frame that is eventually selected by the representative frame selection unit 14 via an output device such as a display device or a printer.

The output unit 16 may output, together with the representative frame, a window for replaying a video image represented by the representative frame, a window for displaying a still image of the key frame, and the like.

The output unit 16 may also superimpose and output various processing results of the image frame extraction processing of the image frame extraction apparatus 1, such as probability values of representative frames or key frames, evaluation values of evaluation functions, labeled action classes, and the like, on the images.

The output unit 16 may store the images of the selected representative frame and the above various processing results of the image frame extraction processing in a storage device constituted with a non-volatile memory.

Further, the output unit 16 may provide a graphical user interface (GUI) and, via the GUI, may allow a user to specify, for example, another key frame and to re-set the specified key frame as a representative frame. Alternatively, the output unit 16 may, via the GUI, may allow the user to change a class labeled on the displayed image to another class.

It should be noted that, the image frame extraction apparatus 1 may be communicably connected to a client device constituted with a personal computer (PC) or the like, and the client device may provide a GUI when the image frame extraction apparatus 1 performs input/output of information to/from the outside, and may include some or all of the components 11 to 16 of the image frame extraction apparatus 1.

<Processing Procedure of Image Frame Extraction Processing>

Figure 2:
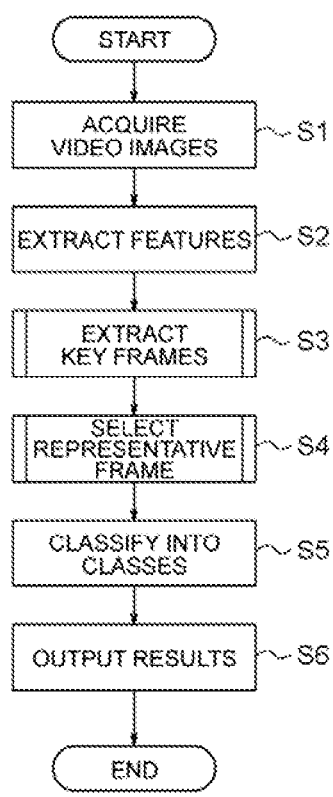
FIG. 2 is a flowchart showing an exemplary processing procedure of an image frame extraction processing performed by the image frame extraction apparatus according to the present embodiment.

FIG. 2 is a flowchart showing an exemplary processing procedure of an image frame extraction processing performed by the image frame extraction apparatus 1 according to the present embodiment.

Each of the steps in FIG. 2 is realized by the CPU reading and executing a program stored in a storage device such as an HDD of the image frame extraction apparatus 1. Also, at least a part of the flowchart shown in FIG. 2 may be realized by hardware. When implemented by hardware, for example, by using a predetermined compiler, a dedicated circuit can be automatically generated on an FPGA (Field Programmable Gate Array) from a program for implementing the respective steps. In addition, a gate array circuit may be formed in the same manner as the FPGA and implemented as hardware. It may also be realized by an ASIC (Application Specific Integrated Circuit).

In step S1, the video image acquisition unit 11 of the image frame extraction apparatus 1 acquires video image data from the video image storage unit 2.

In step S2, the feature extraction unit 12 of the image frame extraction apparatus 1 extracts features of each image frame from the video image data supplied from the video image acquisition unit 11.

According to the present embodiment, the feature extraction unit 12 may extract features of each image frame of the video data using a learning model constituted with, for example, Temporal Segment Networks (TSN).

The TSN includes an RGB CNN (Convolutional Neural Network) for extracting RGB features of an image frame, and an optical flow CNN for extracting an optical flow (i.e., vector field representing motion of an object) of an image frame. The TSN is trained using a plurality of image frame groups (i.e., video clips/video snippets) segmented from a single video image. Thus, the motion of an object in a video image over a predetermined period of time can be modeled by the TSN.

The video image data is segmented into T groups of image frames of the same size (i.e., equal time intervals), and one image frame is selected from each group of image frames (i.e., image frame group), and the T image frames are input to the pre-trained TSN learning model. The TSN learning model analyzes the T image frames and outputs T D-dimensional feature vectors and supplies the T D-dimensional feature vectors to the key frame extraction unit 13.

It should be noted that, the above TSN is no more than a non-limiting example, and the learning model that can be used for feature extraction of image frames in the present embodiment is not limited to the TSN.

In step S3, the key frame extraction unit 13 of the image frame extraction apparatus 1 analyzes the features of each image frame supplied from the feature extraction unit 12, and extracts a plurality of key frames, which serve as candidates for the representative frame of each video image.

Figure 3:
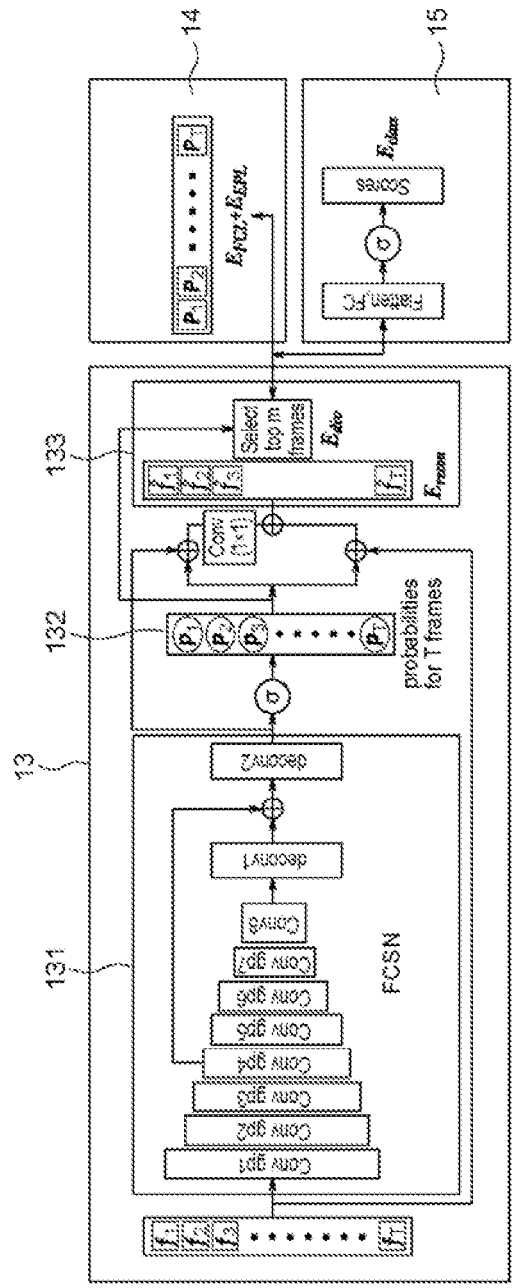
FIG. 3 is a conceptual diagram showing an exemplary module structure of a learning model when the image frame extraction apparatus is implemented in machine learning.

FIG. 3 is a conceptual diagram showing an exemplary module configuration when the key frame extraction unit 13, the representative frame selection unit 14, and the classification unit 15 of the image frame extraction apparatus 1 are implemented in a learning model of machine learning.

Referring to FIG. 3, the key frame extraction unit 13 includes a Fully Convolutional Sequence Network (FCSN) sub-module 131, which takes as input the features of each image frame and analyzes the features of each input image frame, a probability score calculation sub-module 132, which calculates a probability score indicating a probability that each image frame becomes a key frame, and a key frame prediction sub-module 133, which predicts a key frame from the input image frame group based on the features of each image frame and the corresponding probability score. It should be noted that the module configuration of the learning model shown in FIG. 3 is no more than an example and the present embodiment is not limited thereto.

The FCSN is a certain leaning model in which a Fully Convolutional Network (FCN), which has a configuration in which a fully connected layer of the CNN is replaced with a convolutional layer, is modified so as to output a sequence of probabilities (labels) each indicating whether each image frame is a key frame or not. The present embodiment applies this FCSN to the key frame extraction.

The FCSN sub-module 131 of the key frame extraction unit 13 may be constructed as an unsupervised version of the FCSN.

Referring to FIG. 3, the FCSN sub-module 131 has an encoder-decoder structure, and the encoder has eight convolutional layers and the decoder has two deconvolutional layers, respectively.

In the encoder, eight convolutional layers extract the features of an image frame by sliding a plurality of filters relative to the image frame and performing the temporal convolution operation of the features of the image frame, respectively. Convolutional layer groups from group 1 to group 5 (i.e., Conv gp1 to 5) may each have a plurality of convolutional layers and a pooling layer that follows the convolutional layers and compresses the extracted features of the image frame. Convolution layers 6 and 7 (i.e., Conv 6 and Conv 7) each have a single convolutional layer for temporal convolution, and convolution layer 8 (i.e., Conv 8) has a convolutional layer of 1×1.

In the decoder, a skip connection element is arranged between two deconvolutional layers (i.e., deconv 1 and deconv 2), and, for example, an output from the group 4 (i.e., Conv gp4) of the intermediate convolutional layer may be directly input to the subsequent deconvolutional laser (deconv 2).

The probability score calculation sub-module 132 of the key frame extraction unit 13 applies the sigmoid function 6 to the sequence of probability scores (labels) each indicating whether each image frame output from the FCSN sub-module 131 is a key frame or not, and calculates the probability score, which indicates whether each image frame is the key frame or not, for each of the input image frame groups. The sigmoid function is a real function that models the properties of biological neurons, and converts the input values into numerical values in the range of 0 to 1 and outputs the converted values.

The key frame prediction sub-module 133 of the key frame extraction unit 13 predicts, as a key frame, a plurality of image frames for which the probability scores higher than a predetermined threshold is calculated from the input image frame group. Alternatively, the key frame prediction sub-module 133 may predict a predetermined number of image frames as key frames in descending order of the calculated probability scores.

More particularly, according to the present embodiment, the key frame prediction sub-module 133 of the key frame extraction unit 13 weights the features of each image frame output from the FCSN sub-module 131 with the probability score calculated by the probability score calculation module 132. Then, the key frame prediction sub-module 133 reconstructs the features of each image frame by combining the weighted features of each image frame with the original features of each image frame input to the FCSN sub-module 131.

Further, the keyframe prediction sub-module 133 predicts key frames by evaluating the features of each image frame based on the features of each reconstructed image frame using a plurality of loss functions ($E_{recon}$, $E_{div}$ shown in FIG. 3), and details of those loss functions will be described below with reference to FIG. 4. The image frame extraction apparatus 1 according to the present embodiment searches for the parameter for which the output of each loss function is the smallest as the optimal solution in machine learning.

Referring back to FIG. 2, in step S4, the representative frame selection unit 14 of the image frame extraction apparatus 1 selects a representative frame representing the video image from a plurality of key frames extracted by the key frame extraction unit 13.

Referring to FIG. 3, the representative frame selection unit 14 may be implemented in a representative frame selection module including a plurality of loss functions (i.e., $E_{EPL}$ and $E_{FCL}$ shown in FIG. 3) with the coordinate information of the pose ($P_1$, $P_2$, . . . , $P_T$) of the object to be analyzed in each image frame as an input. The representative frame selection unit 14 calculates the displacement of the coordinate information of the input pose with respect to the reference pose and evaluate the calculated displacement using the plurality of evaluation functions so as to select one or a plurality of representative frames, and details of those loss functions will be described below with reference to FIG. 5.

According to the present embodiment, the representative frame selection unit 14 predicts (estimates), as the representative frame, an image frame including an iconic pose that appropriately summarizes an action of a video image using the reinforcement learning that searches for an optimal solution by trial and error. The representative frame selection unit 14 may re-weight the extracted key frames such that a higher weight is assigned to the image frame including the estimated iconic pose.

More particularly, the representative frame selection unit 14 may estimate the iconic pose using weakly supervised learning (i.e., weak supervision) in which only the class to which the video image is classified (e.g., the action class to which the action video image belongs) is labeled as a teacher label (i.e., training label) for each image frame. By using a plurality of loss functions and using the action class, which is the result of classification of each image frame, to evaluate the key frame, it makes it possible to select, as the representative frame, an image frame containing an iconic pose that straightforwardly summarizes the action of the video image and is sufficiently distinguishable from other action classes to adequately summarize the video image in question. According to the present embodiment, it is assumed that the weakly supervised learning, in which the class to which such a video image is classified is used as a sole training label, is also one aspect of so-called unsupervised learning.

Referring back to FIG. 2, in step S5, the classification section 15 of the image frame extraction apparatus 1 classifies each image frame of the video image into a plurality of classes. The classification unit 15 may supply the classified class (e.g., action class) to the key frame extraction unit 13 and the representative frame selection unit 14 as information to be labeled for the corresponding image frame, respectively. The key frame extraction unit 13 and the representative frame selection unit 14 may respectively perform key frame extraction and representative frame selection recursively by the weakly supervised learning using the class (e.g., action class), which is a classification result by the classification section 15, as a training label for each image frame.

Referring now to FIG. 3, the classification unit 15 may be implemented in a classification module including a flattening function that flattens features of nested n-dimensional image frames into a one-dimensional array, and a predetermined loss function.

More particularly, the reconstructed features of the m key frames selected by the key frame extraction unit 13 and the representative frame selection unit 14 are input to the classification unit 15.

The classification unit 15 flattens the features of the selected m key frames into a one-dimensional array using the flattening function, inputs the flattened features of the m key frames into the fully connected layer, and evaluates the fully connected features using a predetermined loss function so as to estimate (predict) the class (e.g., action class) of each key frame.

The classification unit 15 calculates the predicted value of the class (e.g., action class) of each key frame by the loss function $E_{class}$, which evaluates the loss by means of binary cross entropy, as shown in Equation 1 below.

$$E_{class} = \sum_{i=1}^{N} y_i \log(p_{y_i}) + (1 - y_i)\log(1 - p_{y_i})$$ (Equation 1)

Here, $y_i$ is the label of the true action class and $p_{y_i}$ is the label of the predicted action class.

Referring back to FIG. 2, the output unit 16 of the image frame extraction apparatus 1 outputs, via an output device such as a display unit or a printer, an image of the representative frame eventually selected by the representative frame selection unit 14 based on the classification result of the action class output by the classification unit 15.

One or a plurality of representative frames eventually output by the output unit 16 is assumed to be an image frame that has the smallest sum of the losses of the plurality of loss functions used by the key frame extraction unit 13 and the representative frame selection unit 14 and the loss function $E_{class}$ used by the classification unit 15 among the group of image frames input to the learning model in FIG. 3.

The learning model shown in FIG. 3 may be pre-trained using those various loss functions. In other words, the learning model shown in FIG. 3 is a learned model in which the parameters are learned such that the sum of the losses of the plurality of loss functions $E_{EPL}$, $E_{FCL}$, and $E_{class}$ becomes smaller. The image frame extraction apparatus 1 according to the present embodiment selects and outputs the representative frame using this learned model.

In the inference phase, the features of each image frame of a video image and the coordinate information of the pose of an object in the image frame are input to the learning model shown in FIG. 3.

The image frame extraction apparatus 1 according to the present embodiment predicts the probability score ($p_i$) for each image frame together with a classification label of a class using the learning model shown in FIG. 3. The image frame extraction apparatus 1 ranks each image frame based on the calculated probability score such that the image frames including the iconic poses are weighted higher, and selects m image frames in descending order of the eventually calculated probability scores. The image frame with the highest probability score among the selected m image frames can be considered to be the representative frame containing the iconic pose of the object.

<Detailed Processing Procedure of Key Frame Extraction Processing>

Figure 4:
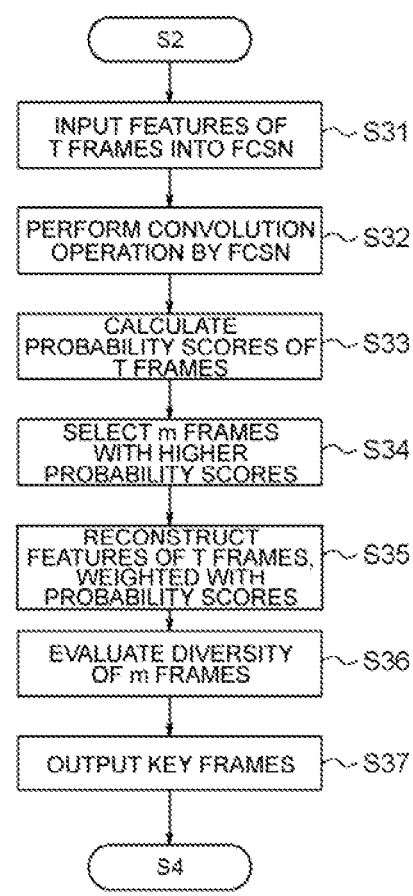
FIG. 4 is a flowchart showing an exemplary detailed processing procedure of a key frame extraction processing in step S3 of FIG. 2, which is performed by a key frame extraction unit of the image frame extraction apparatus according to the present embodiment.

FIG. 4 is a flowchart showing an exemplary detailed processing procedure of the key frame extraction processing of step S3 in FIG. 2, which is performed by the key frame extraction unit 13 of the image frame extraction apparatus 1.

In step S31, the key frame extraction unit 13 of the image frame extraction apparatus 1 inputs the features $f_1, f_2, f_3, \ldots, f_T$ of T frames to the FCSN sub-module 131 via the input channel of the FCSN.

According to the present embodiment, the FCSN used by the key frame extraction unit 13 to analyze the features of a group of image frames and extract key frames may be an unsupervised learning model.

In step S32, the FSCN sub-module 131 of the key frame extraction unit 13 performs a convolution operation on the features $f_1, f_2, f_3, \ldots, f_T$ of T frames input in step S31.

The FCSN sub-module 131 outputs, via the eight convolutional layers and two deconvolutional layers of the FCSN shown in FIG. 3, the probability scores as to whether or not each of the input T-frame features $f_1, f_2, f_3, \ldots, f_T$ is extracted (selected) as a key frame.

Referring to FIG. 3, a skip connection element may be arranged between the first deconvolutional layer (deconv 1) and the second deconvolutional layer (deconv 2). This skip connection causes the output from the fourth convolutional layer group (Conny gp4) to skip the subsequent convolutional layers and the first deconvolutional layer (deconv1) and directly input to the second deconvolutional layer (deconv 2). By arranging the skip connection, it makes it possible to combine the feature map of the coarse layer with the feature map of the fine layer to obtain more informative (richer) image features, and also to summarize the video image using the features of the motion of the object over a longer period of time in time series. As a result, it makes it possible to output the probability score with higher accuracy.

In step S33, the probability score calculation sub-module 132 of the key frame extraction unit 13 applies the sigmoid function σ to the sequence of the probability scores (labels) of the features $f_1, f_2, f_3, \ldots, f_T$ of T frames output by the FCSN sub-module 131, and calculates the normalized probability scores $p_1, p_2, p_3, \ldots, p_T$ ranging within 0 to 1 for the features $f_1, f_2, f_3, \ldots, f_T$ of T frames input in step S31, respectively.

In step S34, the key frame prediction sub-module 133 of the key frame extraction unit 13 extracts m image frames as key frames in descending order of the values of the probability scores $p_1, p_2, p_3, \ldots, p_T$ calculated in step S33. Consequently, the image frame having the highest probability score $p_1, p_2, p_3, \ldots, p_T$ is assumed to be eventually selected as the representative frame through the processing from step S1 to step S5 in FIG. 2.

In step S35, the key frame prediction sub-module 133 of the key frame extraction unit 13 reconstructs the features $f_1, f_2, f_3, \ldots, f_T$ of T frames.

More particularly, the key frame prediction sub-module 133 weights the decoded feature vectors output from the deconvolutional layer of the FCSN sub-module 131 with the probability scores $p_1, p_2, p_3, \ldots, p_T$ output in step S33, respectively, and inputs the weighted feature vectors to the later 1×1 convolutional layer shown in FIG. 3 so as to convert the weighted feature vectors into the original feature representation. Through the 1×1 convolutional layer, the feature vector of each image frame will have the same dimension as the corresponding feature vector at the input frame level.

The key frame prediction sub-module 133 combines the output from the 1×1 convolutional layer with the feature vectors of the features $f_1, f_2, f_3, \ldots, f_T$ of T frames at the input frame level input to the FSCN sub-module 133, respectively. The feature vectors of the original features $f_1, f_2, f_3, \ldots, f_T$ may also be weighted with probability scores $p_1, p_2, p_3, \ldots, p_T$, respectively.

As a result, the original features $f_1, f_2, f_3, \ldots, f_T$ of T frames originally input to the FSCN sub-module 133 are reconstructed into the features $\hat{f}_1, \hat{f}_2, \hat{f}_3, \ldots, \hat{f}_T$ of T frames, respectively.

The key frame prediction sub-module 133 evaluates the reconstructed features ˆf$_1$, ˆf$_2$, ˆf$_3$, ..., ˆf$_T$ of T frames using the loss function E$_{recon}$ shown in Equation 2 below. The loss function E$_{recon}$ evaluates the loss in the feature reconstruction by calculating the mean squared error between the reconstructed features and the input feature vectors for T frames.

$$E_{recon} = \frac{1}{T(T-1)} \sum_{t=1}^{T} \|f_t - \hat{f}_t\|_2 \qquad \text{(Equation 2)}$$

Here, f$_t$ is the original input feature vectors from image frame t, and ˆf$_t$ is the reconstructed features of the t-th image frame. It should be noted that the key frame prediction sub-module 133 may reconstruct, instead of the features of input T frames, the features of m frames selected as the key frames and evaluates the loss in reconstruction.

In step S36, the key frame prediction sub-module 133 evaluates, for the m key frames selected in step S34, whether or not sufficient diversity is ensured among those m key frames using the loss function E$_{div}$ shown in Equation 3 below. The loss function E$_{div}$ evaluates the loss in diversity among the m key frames by calculating the pairwise correlation among the extracted m key frames.

$$E_{div} = \frac{1}{m(m-1)} \sum_{t \in M} \sum_{t \in M, t' \neq t} \frac{\hat{f}_t^T \hat{f}_{t'}}{\|\hat{f}_t\| \|\hat{f}_{t'}\|} \qquad \text{(Equation 3)}$$

Here, f$_t$ is the original input feature vector from image frame t, and ˆf$_t$ is the reconstructed feature vector of the t-th image frame. Also, M is the selected set of indices of image frames and m is the number of selected frames.

The key frame prediction sub-module 133 of the key frame extraction unit 13 may recursively perform the processing from steps S33 to S36 using the evaluation results by each of the above loss functions as weights.

In step S37, the key frame prediction sub-module 133 of the key frame extraction unit 13 extracts m image frames with higher probability scores eventually calculated through the processing from steps S33 to S36, and outputs the extracted m image frames as the key frames to the representative frame selection unit 14 and the classification unit 15, respectively.

As described above, according to the present embodiment, in the keyframe extraction, the image frame extraction apparatus 1 extracts the key frames by unsupervised reinforcement learning without labeling the image frames with the true correct answer data, and further evaluates the loss of the key frames using a plurality of loss functions.

As a result, it makes it possible to summarize the video image in a straightforward manner and extract a group of key frames having higher diversity from each other.

<Detailed Processing Procedure of Representative Frame Selection Processing>

Figure 5:
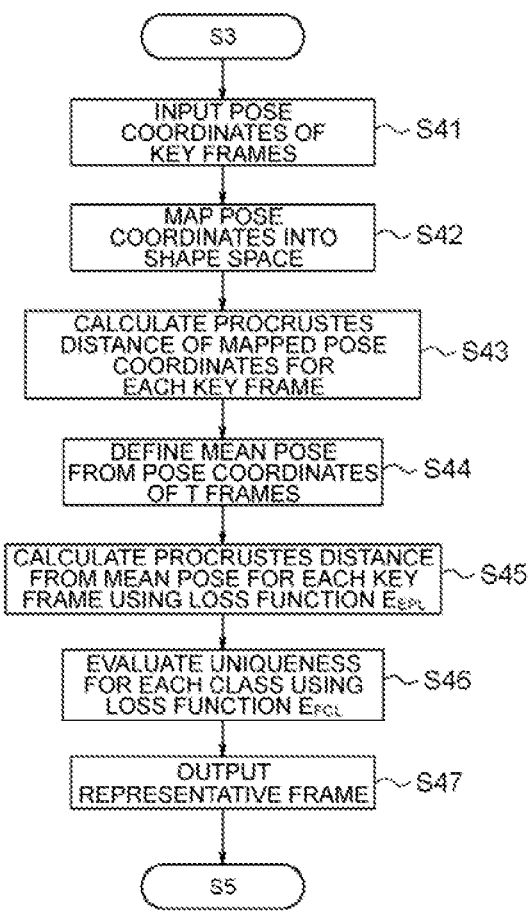
FIG. 5 is a flowchart showing an exemplary detailed processing procedure of a representative frame selection processing in step S4 of FIG. 2, which is performed by a representative frame selection unit of the image frame extraction apparatus according to the present embodiment.

FIG. 5 is a flowchart showing an exemplary detailed processing procedure of the representative frame selection processing of step S4 in FIG. 2 performed by the representative frame selection unit 14 of the image frame extraction apparatus 1 according to the present embodiment.

According to the present embodiment, the image frame extraction apparatus 1 searches for a pose that minimizes a loss in the pose using coordinate information of a pose f an object (e.g., a person) included in an image frame. The adaptively searched pose that minimizes the loss in pose is assumed to be an iconic pose that summarizes the video image in a straightforward manner, and the image frame including the iconic pose is selected as a representative frame that represents the input video image.

According to the present embodiment, the representative frame is selected from a plurality of key frames using a plurality of loss functions including a loss function E$_{EPL}$ and a loss function E$_{FCL}$.

The loss function E$_{EPL}$ evaluates the displacement (i.e., distance) of the pose coordinates from a mean pose, which is an example of the reference pose, and extracts, from the video image, an extreme pose that has the largest distance from the mean pose in the shape space. The loss function E$_{FCL}$ maintains the uniformity of the image frames within the class of the video image (e.g., action class). Details of those loss functions will be described below.

The iconic pose, which is supposed to be included in a representative frame representing a video image in the end, is a pose that is unique for each video image and expresses a specific action. According to the findings of the present inventors, in a video image, in particular, an action video image including an action of an object, the iconic pose is highly likely to be an extreme pose whose displacement (i.e., distance) of the pose coordinates from the mean pose is the largest.

In step S41, the representative frame selection unit 14 of the image frame extraction apparatus 1 inputs the coordinates P$_1$, P$_2$, P$_3$, ..., P$_T$ ({P$_t$}, $t$=1 ..., T) of the pose of the object in the image frame of each of the m key frames extracted by the key frame extraction unit 13. Those posture coordinates may be, but are not limited to, two-dimensional joint positions representing the pose of the object in the extracted key frames, and may be posture coordinates such as three-dimensional joint positions.

In step S42, the representative frame selection unit 14 of the image frame extraction apparatus 1 maps (embeds) the pose coordinates P$_1$, P$_2$, P$_3$, ..., P$_T$ of the m key frames input in step S41, respectively, to the shape space.

More particularly, the representative frame selection unit 14 maps the pose coordinates to the shape space by applying respective transformations of centering, scaling, and rotation to the pose coordinates of each key frame.

Assuming that Z$_t$ is the pose coordinate obtained by centering and scaling the pose coordinate (e.g., joint coordinate) P$_t$ in the image frame t with respect to the pre-shape space, the pose coordinate Z$_t$ in the pre-shape space is expressed by the following Equation 4.

$$Z_t = \frac{CP_t}{\|CP_t\|_2} \qquad \text{(Equation 4)}$$

Here, C is the centering matrix. In the pose coordinate Z$_t$ in the pre-shape space, the position and scale information are removed from the original representation.

In step S43, the representative frame selection unit 14 of the image frame extraction apparatus 1 calculates the Procrustes distance for each of key frames.

The Procrustes distance is the distance between coordinates in the shape space. In the shape space, the superposition processing is applied to a plurality of coordinate groups by centering, scaling, and rotating such that the squared error is minimized between the coordinate groups. The analysis using the Procrustes distance performs the alignment processing so as to minimize the squared error between the coordinates mapped in the shape space.

More particularly, the pose coordinates $P_t$ of the image frame of the video image is mapped to the pre-shape space, and further, an optimal rotation transformation is applied to the pose coordinates $Z_t$ mapped to the pre-shape space, and thus the pose coordinates are mapped to the shape space. The optimal rotation can be obtained from the optimization function expressed in Equation 5 below.

$$\hat{\Gamma}_i = \underset{\Gamma_i \in SO(2)}{\operatorname{argmin}} \sum_{i=1}^{T} \sum_{j=i+1}^{T} [\|Z_i \Gamma_i - Z_j \Gamma_j\|_2]^2 \quad \text{(Equation 5)}$$

Here, $\Gamma_i$ is the optimal rotation applied to the pose coordinates mapped in the pre-shape space such that the pose coordinates mapped in the pre-shape space are aligned with each other, and SO(2) is a two-dimensional Special Orthogonal group.

The optimal rotation in Equation 5 above is applied to the pose coordinates in the pre-shape space, which results in the mapping of the pose coordinates into the shape space. The distance between the coordinates mapped in the shape space is the Procrustes distance.

It should be noted that the pose coordinates used in steps S41 to S43 are not limited to m key frames, and may be more than m image frames in descending order of the probability scores. Alternatively, pose coordinates of T image frames input to the feature extraction unit 12 may be used.

In step S44, the representative frame selection unit 14 of the image frame extraction apparatus 1 determines a mean pose as a reference pose from the pose coordinates of the sampled T image frames.

The mean pose in the shape space is defined as the Fréchet mean $P^F$.

The Fréchet mean indicates the central tendency of a point cloud cluster in the distance space, and may be, for example, an arithmetic mean, median, geometric mean, weighted mean, or the like, of real numbers.

The representative frame selection unit 14 may calculate the mean pose in advance from the sampled T image frames prior to or in parallel with the processing of the key frame extraction unit 13 extracting the key frames.

Fréchet mean $P^F$ as the mean pose of an object in the video image is expressed in Equation 6 below.

$$\mathcal{P}^F = \frac{1}{T}\sum_{i=1}^{T} Z_i \Gamma_i \quad \text{(Equation 6)}$$

In step S45, the representative frame selection unit 14 of the image frame extraction apparatus 1 calculates the Procrustes distance from the mean pose in the shape space to the pose coordinates of each key frame using the loss function $E_{EPL}$, and extracts the extreme pose in which the Procrustes distance to the mean pose is the largest. The loss function $E_{EPL}$, which evaluates the loss in the pose of each key frame, is represented by the following Equation 7.

$$E_{EPL} = \frac{1}{m}\sum_{t \in M} \exp\left(-\frac{\|Z_t \Gamma_t - \mathcal{P}^F\|_2}{2\sigma^2}\right) \quad \text{(Equation 7)}$$

Here, $P^F$ is the Fréchet mean expressed in Equation 7, in other words, the mean pose of the object in the video image, and $Z_i \Gamma_i$ is the pose coordinates of each image frame mapped in the shape space. The variance $\sigma$ can take any value, but may be set to, for example, 10.

FIGS. 6A to 6C and 7A to 7C are diagrams showing examples of the mean pose frame and the extreme pose frame extracted from each action video image, respectively.

Figure 6A:
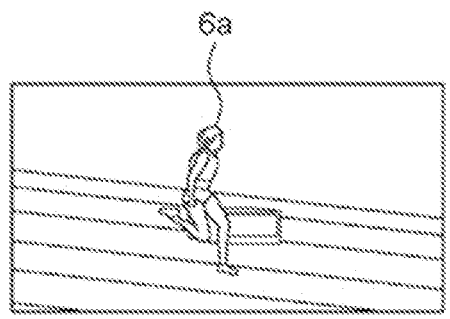
FIGS. 6A to 6C are diagrams showing examples of a mean pose frame and an extreme pose frame extracted from an action video image of long jump, respectively.
Figure 6B:
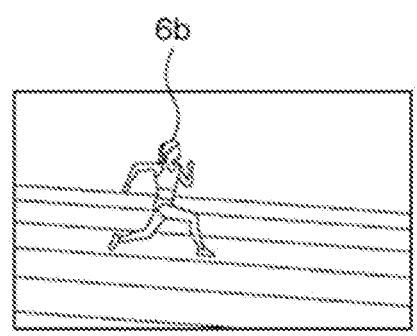
Figure 6C:
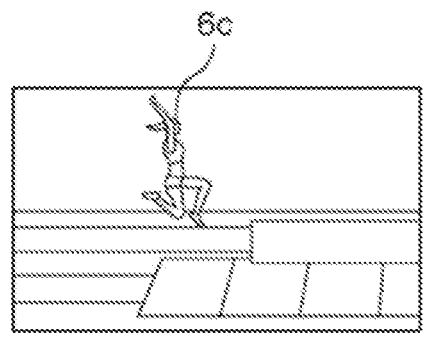

FIG. 6A shows an image frame including the mean pose 6a, which is calculated as the Fréchet mean, of an athlete performing the long jump, and FIGS. 6B and 6C show image frames including the extreme poses 6b and 6c extracted by the loss function $E_{EPL}$, respectively.

Figure 7A:
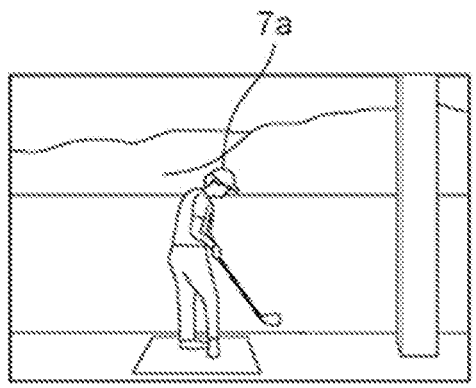
FIGS. 7A to 7C are diagrams showing examples of a mean pose frame and an extreme pose frame extracted from an action video image of golfing, respectively.
Figure 7B:
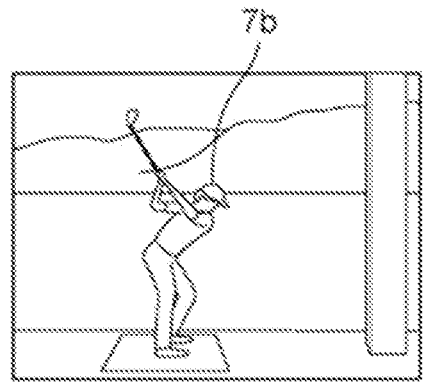
Figure 7C:
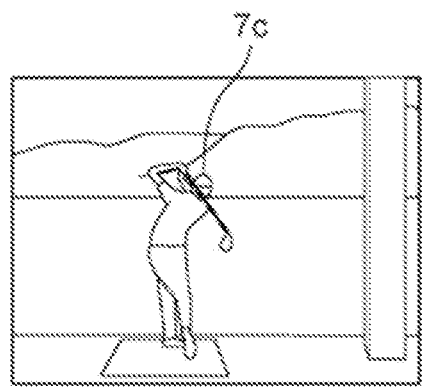

Similarly, FIG. 7A shows an image frame including the mean pose 7a, which is calculated as the Fréchet mean, of an athlete performing the golf-swinging, and FIGS. 7B and 7C show image frames including the extreme poses 7b and 7c extracted by the loss function $E_{EPL}$, respectively.

Referring to FIGS. 6A to 6C and 7A to 7C, it can be understood that the mean pose is close to the normal upright pose taken by a person in a stationary or semi-stationary state, while the extreme poses are all in motion of an action and the limb joint positions of the objects are greatly distant from the limb joint positions in the normal state.

Referring back to FIG. 5, in step S46, the representative frame selection unit 14 of the image frame extraction apparatus 1 evaluates the uniqueness of each class (e.g., action class) using the loss function $E_{FCL}$. More particularly, the representative frame selection unit 14 evaluates the uniformity of the group of image frames within the class (e.g., action class) and the uniqueness (in other words, distinctiveness) among the classes (e.g., action classes) using the loss function $E_{FCL}$.

The loss function $E_{FCL}$ is a function that evaluates the Frame Contrastive Loss in the image frame contrast, whereby video images belonging to the same action class have similar features in the selected frame group, and video images belonging to different action classes have different features in the selected frame group.

The loss function $E_{FCL}$ is expressed by the following Equation 8.

$$E_{FCL} = \frac{1 + \Sigma_{i,j \in V} 1_{\{y_i = y_j\}} \|\mathcal{F}_i - \mathcal{F}_j\|}{N_V \left(1 + \Sigma_{i,j \in V} 1_{\{y_i \neq y_j\}} \|\mathcal{F}_i - \mathcal{F}_j\|\right)} \quad \text{(Equation 8)}$$

Here, $\mathcal{F}_i = [\hat{f}_t^i, \mathcal{P}_t^i]_{t \in M}$

Here, V is the index of the video image in the mini-batch, $N_V$ is the number of the mini-batch, $y_i$ is the action label of the i-th video image in the mini-batch, and $\hat{f}_t^i$ denotes the reconstructed features of the t-th image frame in the i-th video image. Also, $\mathcal{P}_t^i$ denotes the pose coordinates of the t-th image frame in the i-th video image.

The loss function $E_{FCL}$ minimizes the loss of the least square error (L2) of features belonging to the same class (i.e., numerator in Equation 8) and maximizes the loss of the least square error (L2) of features belonging to different classes (i.e., denominator in Equation 8).

Figure 8:
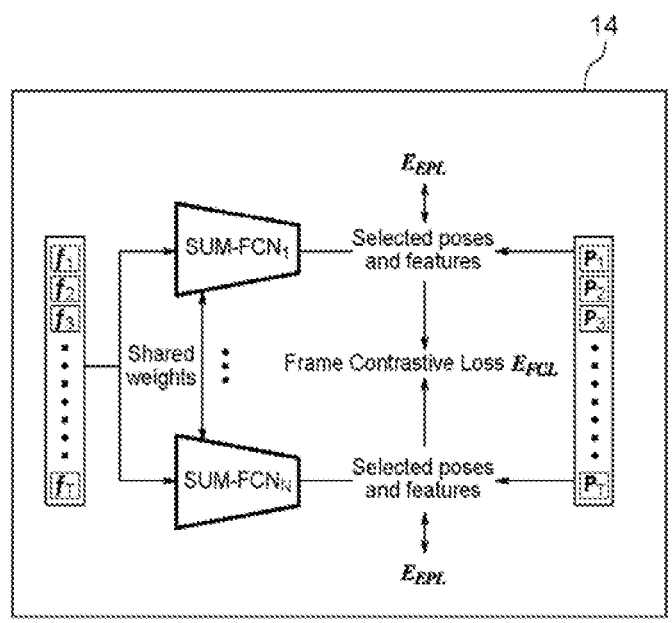
FIG. 8 is a conceptual diagram showing an exemplary detailed module structure of the representative frame selection module of FIG. 3.

FIG. 8 is a conceptual diagram showing an exemplary detailed module configuration of a learning model including two loss functions implemented in a representative frame selection unit 14.

Referring to FIG. 8, N denotes the number of classes in the action video data set.

In FIG. 8, the loss function $E_{FCL}$ evaluates the uniqueness of each class using N Siamese networks, which are weighted in common and each corresponds to one action class. Each Siamese network is trained to have a smaller distance when the input feature set (group) is of the same class and a larger distance when the input feature set (group) is of a different class.

As shown in FIG. 8, a loss function $E_{EPL}$ that selects extreme poses may be applied to selected pose coordinates from all of the video images in the mini-batch. The features and poses of the video images in the mini-batch may be selected for the loss function $E_{FCL}$ that evaluates the frame contrast loss using N Siamese networks.

Returning to FIG. 4, in step S47, the representative frame selection unit 14 of the image frame extraction apparatus 1 outputs the representative frame eventually selected by performing the processing from steps S41 to S46. The representative frame output in step S47 is one or a plurality of image frames including an extreme pose, which is an iconic pose symbolizing a video image.

More particularly, the representative frame selection unit 14 selects, as the representative frame, an image frame with the smallest loss using the final loss function $E_{iconic}$ shown in Equation 9 below.

$$E_{iconic} = \lambda_1 E_{class} + \lambda_2 E_{div} + \lambda_3 E_{recon} + \lambda_4 E_{EPL} + \lambda_5 E_{FCL} \quad \text{(Equation 9)}$$

Here, the coefficients $\lambda 1$ to $\lambda 5$ can be found by hyperparameter search and may be, for example, but not limited to, $\lambda 1, \lambda 4 = 0.35$ and $\lambda 2, \lambda 3, \lambda 5 = 0.1$.

The learning model shown in FIG. 3 according to the present embodiment may be trained using the above loss functions.

In the inference phase, the features and pose coordinates of the image frames are input to the learning model. The learning model predicts a probability score ($p_i$) for each image frame along with a classification label (i.e., class). Based on the probability score, the image frames are ranked and m image frames are selected in descending order of the probability scores.

Ideally, the image frame with the highest probability score would represent the image frame containing the iconic pose. It should be noted that, in the case that accurate poses can be detected and predicted for almost all of the selected image frames, the image frame extraction apparatus 1 may re-rank the selected image frames based on the Procrustes distance and select the image frame with the largest Procrustes distance.

FIGS. 9A to 9E and 10A to 10E show non-limiting examples of an input image frame group constituting a video image and a representative frame extracted from the input image frame group, respectively.

Figure 9A:
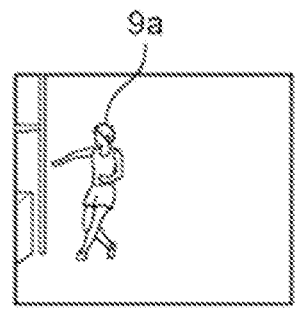
FIGS. 9A to 9E are diagrams showing an example of a representative frame extracted from an action video image sequence of the long jump.
Figure 9B:
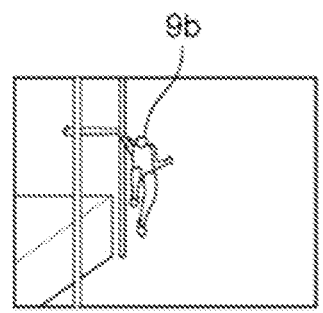
Figure 9C:
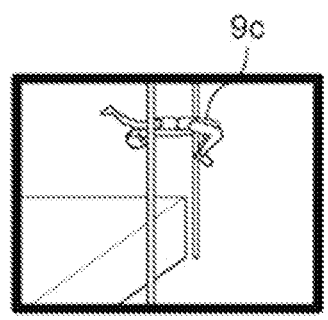
Figure 9D:
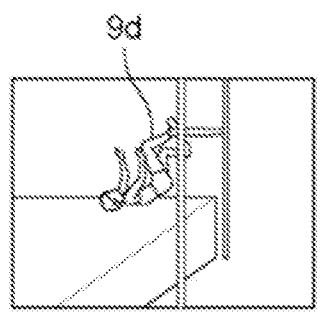
Figure 9E:
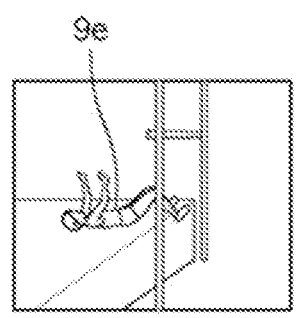

Referring to FIGS. 9A to 9E, a sequence of an action video image of a person performing a high jump is shown in the order of FIG. 9A, FIG. 9B, FIG. 9C, FIG. 9D, and FIG. 9E. The image frame extraction apparatus 1 selects the image frame in FIG. 9C as a representative frame. The representative frame shown in FIG. 9C includes a pose 9c of the person. The pose 9c of the person included in the representative frame of FIG. 9C is an extreme pose in which the limb joints of the person are the most distant from the limb joint positions in the normal state, as compared to the other poses 9a, 9b, 9d, and 9e of the person, during the jumping action of the high jump. It can be seen that the pose 9c is an iconic pose which most straightforwardly indicates the action of the high jump.

Figure 10A:
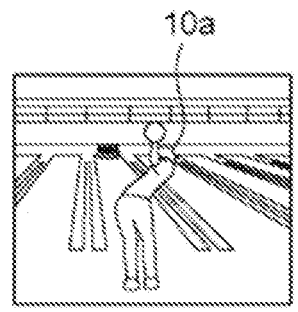
FIGS. 10A to 10E are diagrams showing an example of a representative frame extracted from an action video image sequence of the bowling.
Figure 10B:
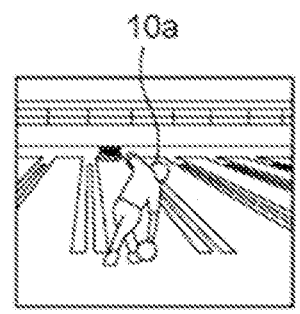
Figure 10C:
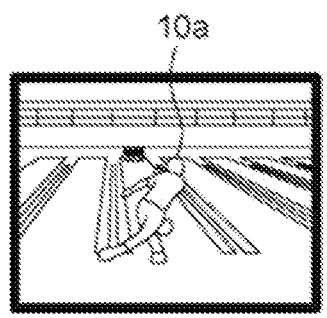
Figure 10D:
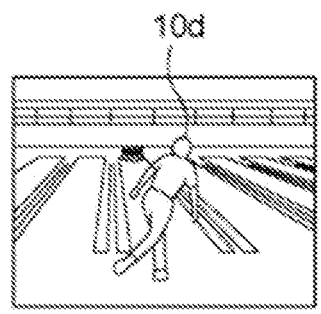
Figure 10E:
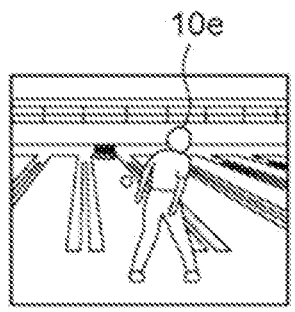

Similarly, Referring to FIGS. 10A to 10E, a sequence of an action video image of a person playing bowling is shown in the order of FIG. 10A, FIG. 10B, FIG. 10C, FIG. 10D, and FIG. 10E. The image frame extraction apparatus 1 selects the image frame in FIG. 10C as a representative frame. The representative frame shown in FIG. 10C includes a pose 10c of the person. The pose 10c of the person included in the representative frame of FIG. 10C is an extreme pose in which the limb joints of the person are the most distant from the limb joint positions in the normal state, as compared to the other poses 10a, 10b, 10d, and 10e of the person, during the throwing action of the bowling. It can be seen that the pose 10c is an iconic pose which most straightforwardly indicates the action of the bowling.

Furthermore, when contrasting the representative frame of high jump shown in FIG. 9C with another representative frame of bowling shown in FIG. 10C, it can be understood that the iconic poses 9c and 10c are different poses that are sufficiently distinguished from each other to be representative of their respective action classes, high jump and bowling, respectively.

As described above, according to the present embodiment, an image frame extraction apparatus extracts a group of key frames from a video image based on features of each image frame constituting the video image, and classifies the group of key frames into one of a plurality of classes. The image frame extraction apparatus also automatically extracts a representative frame from the extracted key frame group based on a displacement of a pose of an object in each image frame with respect to a reference pose and a class of the classified image frame group.

The representative frame that is eventually extracted from the video image includes an iconic pose of the object that straightforwardly summarizes the characteristics of the action of the object in the video image and is sufficiently distinguishable from other types of video images.

As a result, it makes it possible to extract the representative image frame from video data in a more appropriate and accurate manner so as to contribute to improving the accessibility and availability of many video contents scattered on the Web, or the like.

Modification to Embodiments

Although in the above embodiment, a certain example has been described in which the key frame extraction unit 13 of the image frame extraction apparatus 1 extracts a plurality of key frames, the key frame extraction unit 13 may alternatively extract a single key frame with the highest probability score.

Also, the representative frame selection unit 14 may evaluate the loss obtained from the pose coordinates for image frames other than the extracted key frames, assign the evaluation result as a weight, and allow the key frame extraction unit 13 to re-calculate the probability score for each image frame.

Furthermore, when an object to be analyzed in the video image is unclear or is obscured by other foreground objects, noise will be generated, making it difficult to accurately detect the pose of the object in each image frame.

In this case, for example, for image frames in which the detected pose coordinates of the object are below a predetermined confidence value, the pose coordinates may be interpolated by estimating the pose coordinates in the shape space based on the pose coordinates of the image frames preceding and following thereof in the time series.

<Hardware Configuration of Image Frame Extraction Apparatus>

Figure 11:
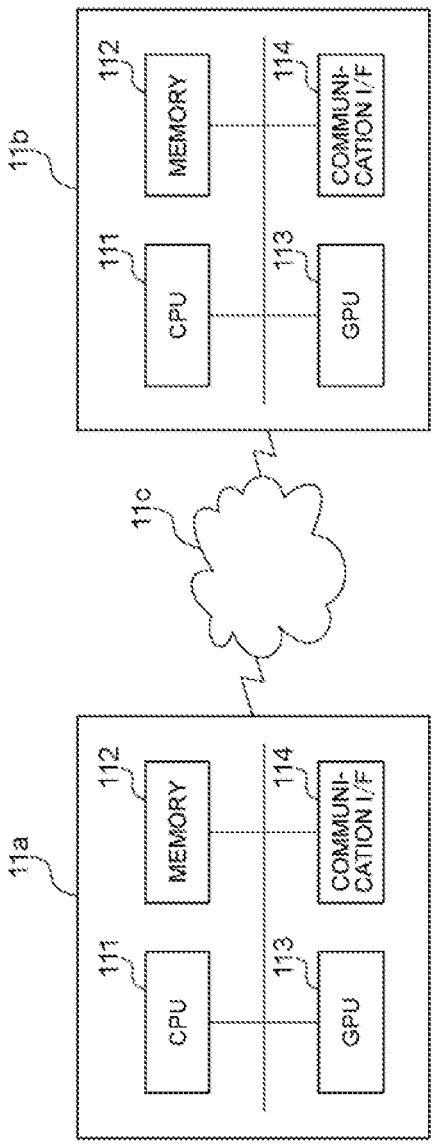
FIG. 11 is a block diagram showing an exemplary hardware configuration of the image frame extraction apparatus according to the present embodiment.

FIG. 11 is a diagram showing a non-limiting example of the hardware configuration of the image frame extraction apparatus 1 according to the present embodiment.

The image frame extraction apparatus according to the present embodiment may be implemented on any one or more computers, mobile devices, or any other processing platform.

Referring to FIG. 11, an example of the image frame extraction apparatus 1 being implemented in a computer system including a plurality of computers 11a and 11b is shown. The plurality of computers 11a and 11b may be inter-communicatively connected by a wired or wireless network 11c.

As shown in FIG. 11, each of the computer 11a and 11b may include a CPU (Central Processing Unit) 111, a memory 112, a GPU (Graphics Processing Unit) 113, and a communication I/F 114. The CPU 111, the memory 112, the GPU 113, and the communication I/F 114 are interconnected by a system bus.

Although two computers 11a and 11b are illustrated in FIG. 11, the number of computers on which the present embodiment can be implemented is not limited thereto, and may be a single or three or more. All or part of the computers 11a and 11b may be equipped with an output device such as a display for outputting various processing results described above, an input device for inputting various commands, and an external memory.

The CPU 111 includes one or more processors, and reads a program from a ROM (Read Only Memory) to load the program to a RAM (Random Access Memory), and executes the loaded program using the RAM as a work area. Thus, the CPU 111 comprehensively controls respective components of the computers 11a and 11b. The program to be read by the CPU 111 may be provided via a network 11c such as the Internet, for example, or may be stored in a non-volatile memory such as an HDD (Hard Disk Drive), an SSD (Solid State Drive), or the like, or may be stored in a computer readable external storage medium such as a DVD-ROM or a USB memory.

The memory 112 includes memory devices such as a ROM, a RAM, and a hard disk drive. The ROM is a non-volatile memory that stores control instructions or programs for operating the CPU 111. The RAM is a volatile random access memory and is used for work memory and temporary storage of data when executing a program.

The GPU 113 has higher computational capabilities than the CPU 111, and running multiple or many GPUs 113 in parallel provides higher processing performance, especially for image processing applications that use machine learning, such as the present embodiment. The GPU 113 typically includes a processor and shared memory. Each processor retrieves data from the fast shared memory and executes a common program to perform a large number of similar computational operations at a high speed.

The communication I/F 114 provides the computers 11a and 11b with an interface to the network 11c, and performs communication with external devices via the network 11c. Video image data, various parameters, and the like are sent and received to/from the external device via the communication I/F 114. According to the present embodiment, the communication I/F 114 may perform communication via a wired LAN (Local Area Network) that conforms to a communication standard such as Ethernet (registered trademark), or via a leased or dedicated line. However, the network available in the present embodiment is not limited thereto, and may be constituted with a wireless network. The wireless network includes a wireless PAN (Personal Area Network) such as Bluetooth (registered trademark), ZigBee (registered trademark), UWB (Ultra Wide Band), and the like. The wireless network also includes wireless LAN (Local Area Network) such as Wi-Fi (Wireless Fidelity) (registered trademark), and wireless MAN (Metropolitan Area Network) such as WiMAX (registered trademark). The wireless network further includes wireless WAN (Wide Area Network) such as LTE/3G, 4G, and 5G. The network that is capable of connecting and communicating with each device mutually may suffice, and the standard, scale, and configuration of the communication are not limited to the above.

The functions of at least some of the components of the image frame extraction apparatus 1 shown in FIG. 1 may be realized by the CPU 111 executing a program. However, at least some of the functions of the components of the image frame extraction apparatus 1 shown in FIG. 1 may be operated as dedicated hardware. In this case, the dedicated hardware operates based on the control of the CPU 111.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Image Frame Extraction Apparatus; 2: Video Image Storage Unit; 11: Video Image Acquisition Unit; 12: Feature Extraction Unit; 13: Key Frame Extraction Unit; 14: Representative Frame Selection Unit; 15: Classification Unit; 16: Output Unit; 111: CPU; 112: Memory; 113: GPU; 114: Communication I/F; 131: FCSN Sub-module; 132: Probability Score Calculation Sub-module; 133: Key Frame Prediction Sub-module

What is claimed is:

1. An image frame extraction apparatus, comprising:
at least one memory configured to store program code; and
electric circuitry including at least one of a field programmable gate array (FPGA), an application specific integrated circuit (ASIC), and at least one processor, the at least one processor being configured to read and operate according to the program code, the electronic circuitry configured to:
acquire a video image;
extract features of each of a plurality of image frames of the acquired video image;
analyze the extracted features of each of the plurality of image frames, and extract candidates of a representative frame from the plurality of image frames; and
for each of the extracted candidates of the representative frame, calculate a displacement in a shape space of a pose of an object in the image frame with respect to a reference pose, and select the representative frame from the candidates of the representative frame based on the calculated displacement in the shape space.

2. The image frame extraction apparatus according to claim 1, wherein selecting the representative frame selects, as the representative frame, an image frame including a pose having the largest distance in the shape space with respect to the reference pose.

3. The image frame extraction apparatus according to claim 1, wherein
selecting the representative frame maps coordinates of the pose of the object in the plurality of image frames to the shape space, respectively, and sets a mean pose obtained by averaging the mapped coordinates of the pose to the reference pose.

4. The image frame extraction apparatus according to claim 1, wherein
selecting the representative frame superimposes, by applying at least one of centering, scaling, and rotational transformation, the coordinates of the pose of the object in the plurality of image frames so as to minimize a squared error between the coordinates, and calculates Procrustes distance of the coordinates of the pose with respect to coordinates of the reference pose, and selects, as the representative frame, an image frame including a pose having the smallest calculated Procrustes distance.

5. The image frame extraction apparatus according to claim 1, wherein
selecting the representative frame selects the representative frame from the candidates of the representative frame using a learning model that is trained such that a loss is to be smaller for a first loss function that calculates the loss of the pose of the object with respect to the coordinates of the reference pose.

6. The image frame extraction apparatus according to claim 1, further comprising:
a classifier that classifies the plurality of image frames into one of a plurality of classes and assigns the classified class to each of the plurality of image frames; and
selecting the representative frame selects the representative frame based on the class assigned by the classifier.

7. The image frame extraction apparatus according to claim 6, wherein
selecting the representative frame selects the representative frame from the candidates of the representative frame using a learning model that is trained such that an output of a second loss function is to be smaller, the second loss function employing, as a numerator, a loss in features of image frames to which a same class are assigned, and employing, as a denominator, a loss in features of image frames to which different classes are assigned.

8. The image frame extraction apparatus according to claim 6, wherein
extracting candidates of the representative frame extracts the candidates of the representative frame using a learning model that uses the classes assigned to the plurality of image frames, respectively, by the classifier as a sole training label.

9. The image frame extraction apparatus according to claim 1, wherein
extracting candidates of the representative frame calculates a score of probability of being extracted as a candidate of the representative frame based on features analyzed by a convolution operation for each of the plurality of image frames, and extracts, as the candidate of the representative frame, an image frame having a higher score of the calculated probability.

10. The image frame extraction apparatus according to claim 9, wherein
extracting candidates of the representative frame reconstructs the features by weighting the features of each of the extracted plurality of image frames using the calculated scores of probability as a weight, and extracts the candidates of the representative frame based on the reconstructed features.

11. The image frame extraction apparatus according to claim 9, wherein
extracting candidates of the representative frame recursively calculates the score of probability using information of the calculated displacement in the shape space as a weight.

12. An image frame extraction method executed by an image frame extraction apparatus, comprising:
acquiring a video image;
extracting features of each of a plurality of image frames of the acquired video image;
analyzing the extracted features of each of the plurality of image frames, and extracting candidates of a representative frame from the plurality of image frames; and
for each of the extracted candidates of the representative frame, calculating a displacement in a shape space of a pose of an object in the image frame with respect to a reference pose, and selecting the representative frame from the candidates of the representative frame based on the calculated displacement in the shape space.

13. A non-transitory computer-readable recording medium for causing a computer to execute an image frame extraction, the non-transitory computer-readable recording medium causing the computer to execute processing comprising:
a video image acquisition process for acquiring a video image;
a feature extraction process for extracting features of each of a plurality of image frames of the video image acquired by the video image acquisition process;
a representative frame candidate extraction process for analyzing the features of each of the plurality of image frames extracted by the feature extraction process, and extracting candidates of a representative frame from the plurality of image frames; and
a representative frame selection process, for each of the candidates of the representative frame extracted by the representative frame candidate extraction process, for calculating a displacement in a shape space of a pose of an object in the image frame with respect to a reference pose, and selecting the representative frame from the candidates of the representative frame based on the calculated displacement in the shape space.

* * * * *